Hill et al. [45] Jan. 23, 1973
[11] 3,712,377

[54] OIL RECOVERY PROCESS USING AN EMULSION MODIFIER-CONTAINING DILUTE AQUEOUS SURFACTANT SYSTEM

[75] Inventors: Harold J. Hill; David Ross Thigpen, both of Houston, Tex.

[73] Assignee: Shell Oil Company, Houston, Tex.

[22] Filed: Oct. 26, 1971

[21] Appl. No.: 192,129

[52] U.S. Cl. .................................. 166/252, 166/273
[51] Int. Cl. ............................................. E21b 43/22
[58] Field of Search ............... 166/252, 250, 273–275

[56] References Cited

UNITED STATES PATENTS

| | | |
|---|---|---|
| 3,330,344 | 7/1967 | Reisberg ........................... 166/274 |
| 3,348,611 | 10/1967 | Reisberg ........................... 166/274 X |
| 3,477,511 | 11/1969 | Jones et al. ...................... 166/274 |
| 3,493,048 | 2/1970 | Jones ............................... 166/252 |
| 3,506,070 | 4/1970 | Jones ............................... 166/274 X |
| 3,508,612 | 4/1970 | Reisberg et al. .................. 166/274 |
| 3,536,136 | 10/1970 | Jones ............................... 166/252 |
| 3,589,444 | 6/1971 | Johnson et al. .................. 166/274 |
| 3,605,891 | 9/1971 | Ayers, Jr. ......................... 166/273 |
| 3,637,017 | 1/1972 | Gale et al. ........................ 166/274 |
| 3,638,728 | 2/1972 | Hill .................................. 166/273 |

Primary Examiner—Stephen J. Novosad
Attorney—Harold L. Denkler et al.

[57] ABSTRACT

A process for displacing oil within a subterranean reservoir by injecting a surfactant system that contains an emulsion modifier that either prevents the formation of an emulsion or reduces the bypassing of oil due to the formation of an emulsion.

25 Claims, 5 Drawing Figures

OIL RECOVERY PROCESS USING AN EMULSION MODIFIER-CONTAINING DILUTE AQUEOUS SURFACTANT SYSTEM

BACKGROUND OF THE INVENTION

This invention relates to displacing oil within a subterranean reservoir by injecting an aqueous surfactant system into the reservoir.

The following terms are used with the meanings indicated. A surfactant system is a solution and/or dispersion of surface active materials in liquid. An aqueous surfactant system, commonly referred to as a chemical slug is one having an aqueous liquid continuous-phase and a proportion of aqueous liquid components (solvent and/or solute) that substantially equals or exceeds the proportion of oil-phase components (solvent and/or solute). An active surfactant system is one having an interfacial tension between it and an oil-containing reservoir fluid that is less than about 0.01 dyne per centimeter. The oil displacement efficiency of a surfactant system is the extent to which it effects a complete displacement of oil-containing reservoir fluid within the part of a reservoir that is permeated by the surfactant system. The sweep efficiency, e.g., in a chemical flood oil recovery process, is the extent to which the entire reservoir (within the flood pattern) is contacted by the chemical system.

In a chemical flood oil-displacement process, chemicals inclusive of an aqueous surfactant system are injected into a subterranean reservoir to displace oil-containing reservoir fluid within the reservoir. In a well treatment oil-displacing process, a relatively small chemical slug is injected to form a ring (which becomes thinner as it is displaced away from the injection well) that soon breaks up and becomes dispersed within the reservoir, usually when the ring has been displaced by from about 5 to 10 feet from the injection well. In an oil-recovery process, a relatively large chemical slug is injected to form a ring that remains substantially intact as it is displaced from an injection location to a production location, usually involving distances of from about 50 to several hundred feet.

The value of oil recovered from a reservoir is diminished by the cost of chemicals injected into and lost within the reservoir. The cost (per pound) of materials used in chemical flooding processes usually decrease in the order of: thickening agents, surface active materials, oil solvents, water-soluble salts, and water. For equal volumes of surfactant systems of equal activities and mobilities, the cost of an active aqueous surfactant system is generally less than that of an oil-phase-continuous surfactant system. The latter type of system is commonly called a soluble oil, a microemulsion, or an oil-external micellar dispersion.

In certain reservoirs containing relatively viscous oils, the properties of the oil-containing reservoir fluid and the reservoir rocks are such that the relatively dilute and low cost aqueous surfactant systems tend to interact with the reservoir oils to form low mobility emulsions. The tendency for such emulsions to form has heretofore led to such reservoirs being treated only with oil-phase-continuous systems, which tend to avoid the formation of emulsions due to the interaction of the surfactant system and oil-containing reservoir fluid, but which are relatively expensive because of their high content of organic components.

SUMMARY OF THE INVENTION

In accordance with the present invention, the need for using a relatively expensive, oil-phase-external, surfactant system to effect oil displacement in a reservoir in which an active aqueous surfactant system tends to form a relatively viscous (low mobility) emulsion, is avoided by a combination of testing, formulating and injecting steps. Tests are made of the oil displacement behavior of an active aqueous surfactant system, (preferably one containing less than about 8 percent oil-phase material components such as hydrocarbons, surfactants, thickeners, etc.) having a mobility that is at least substantially as low as that of the oil-containing reservoir fluid. The tests are preferably made in a model or core of the reservoir at the reservoir temperature. Where such a surfactant system shows a tendency to form a low mobility emulsion, it is modified by adding an emulsion modifier in an amount sufficient to avoid the deleterious effects of emulsion formation by (1) avoiding the emulsification, (2) increasing the coalescence rate of the emulsion to a value such that complete separation of the emulsion into its respective oleic and aqueous phases occurs within a few hours and/or (3) reducing the emulsion viscosity to a level such that its mobility in the reservoir will be more than the mobility of the chemical slug. The emulsion modifier-containing aqueous surfactant system is injected into the reservoir to displace oil within the reservoir.

An emulsion that may be formed by injecting a dilute, active, aqueous surfactant system (or chemical slug) into a reservoir may comprise (1) oil and oil soluble chemical slug components dispersed in a continuous aqueous phase containing water soluble components of the chemical slug, (2) an aqueous phase containing water soluble components of the surfactant slug contained in a continuous reservoir oil phase containing the oil soluble components of the surfactant slug or (3) more complex emulsions such as an aqueous phase predominately derived from the surfactant slug and containing a part of the water soluble components from the surfactant slug dispersed in the reservoir oil containing the oil soluble components from the surfactant slug, this entire emulsion being in turn dispersed in an aqueous phase predominately derived from reservoir water but containing a part of the water soluble components from the surfactant slug. When an emulsion is formed by interaction between chemical slug and reservoir oil and this emulsion is less mobile (in general more viscous) than the chemical slug, said emulsion will be by-passed or fingered through by the remaining slug. Since the portion of the slug which fingers through such an emulsion encounters unemulsified crude oil immediately upon breaking through the emulsion zone, additional emulsion is formed. This new emulsion is in turn bypassed by chemical slug with the continuing formation of emulsion. In this fashion, all of the chemical slug can become a component part of a viscous emulsion. The degree to which the chemical slug fingers through or bypasses the emulsion and thus generates new emulsion is determined by (1) the stability of the emulsion with respect to time and (2) the mobility of the chemical slug relative to the mobility of the emulsion. If the ratio of chemical slug mobility to emulsion mobility is one or less, the emulsion will not be bypassed but will be pushed ahead of the slug without damage to the oil recovery process. As the ratio of mobilities increases above 1, more and more tendency for bypassing occurs. Addition of increased amounts of mobility control agent to the chemical slug does not, in general, alleviate the harmful effects of emulsions since the emulsion viscosity itself may be increased by the added thickener. In the extreme but not unusual case of a viscous and very stable emulsion, the entire slug may become emulsified with reservoir fluids. When this occurs, the thickened slug following the chemical slug must be less mobile than the emulsion or it will bypass the emulsion resulting in failure of the oil recovery process and loss of the chemical slug. For the less mobile possible emulsions, the amount of polymer or thickener required to provide a thickened slug with a sufficiently low mobility to displace the emulsion may easily be so great as to seriously impair the economics of the oil recovery process.

DESCRIPTION OF THE INVENTION

Figure 1:
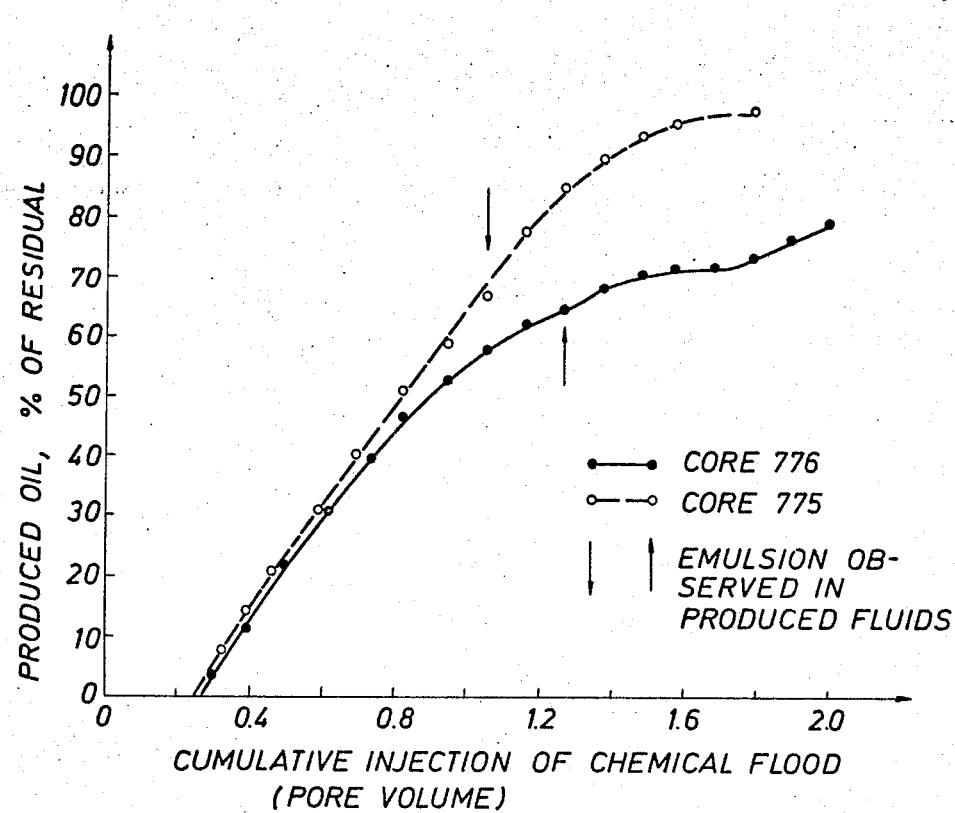
FIGS. 1 to 5 are each a plot of the variations of one designated quantity with increases in another designated quantity.

The introduction into a surfactant system of an agent which avoids emulsification entirely is a desirable goal but may require excessive amounts of costly additives, such that the economics of the resulting recovery process would be unfavorable. When this is the case, it is advantageous to evaluate the same additive at lower concentrations or to select other materials which, for the particular system of chemical slug and reservoir fluids may increase the rate of coalescence of the emulsions so that they break into their component phases within a relatively short time. Although an emulsion of this character may be formed and temporarily bypassed by the slug in the reservoir; if it separates within a few hours, the extent of bypassing will be negligible since frontal advance rates in most reservoirs is of the order of 1 foot per day. Alternatively, it may be found that one of the tested emulsion modifiers results in a relatively stable emulsion with greatly reduced viscosity. If this reduced viscosity is low enough to be equal to or less than the slug viscosity, it will, in general, by displaced efficiently by the slug. It may be found that an emulsion modifier will serve to both reduce viscosity and increase coalescence rate. In this case, the combined beneficial effects may be fully realized economically be selecting a concentration of the modifier just barely high enough to give the desired result of efficient oil displacement from the reservoir. For example, it may be found that a given emulsion modifier at an economically low concentration will cause otherwise highly stable emulsions to coalesce in 18 to 36 hours and that while these emulsions are in existence, their viscosity is only 1.5 to 2 times the viscosity of the slug. Such properties should allow for efficient oil displacement.

Included among the many materials useful as emulsion modifiers in the present invention are semipolar organic compounds, such as amines, diamines, polyethoxylated amines, amides, sulfonamides of water soluble petroleum sulfonic acids, water-soluble oil-insoluble petroleum sulfonates, ketones, alcohols, and the like. In general, semipolar organic compounds which are useful in breaking oil field emulsions are useful in the practice of the present invention. Preferred materials include semipolar compounds, such as alcohols, polyethoxylated amines, the water-soluble, oil-insoluble petroleum sulfonates. Expecially preferred materials include isobutyl alcohol, PYRONATE 30, PYRONATE 50, ETHODUOMEEN T/25 and ETHODUOMEEN T/20.

The present use of an alcohol in a surfactant system is different from the use of generally similar alcohols or other semi-polar organic compounds as co-solvents (or co-surfactants) in relatively high oil-phase-material-content micellar systems in which such co-solvents serve to reduce the viscosity and/or to enhance the thermal stability of the micellar system. Although such relatively high oil-phase-material-content systems are generally free of a tendency to form a low mobility emulsion within an oil reservoir, their use is relatively expensive, and the avoidance of a need for their use is a primary object of the present invention. In addition, in an oil recovery operation, the present use of a relatively low cost, low oil-phase-material-content surfactant system that contains an emulsion modifier which avoids emulsification or increases coalesence rates of emulsions causes most of the displaced oil to be recoverable in the form of a relatively water-free and non-emulsified liquid phase.

The components of a chemical slug used in the present invention can contain substantially any mixture of surfactants, electrolytes, and/or cosurfactants, cosolvents, semi-polar materials and thickeners that is adapted to form an aqueous chemical slug having an interfacial tension of less than about 0.01 dyne per centimeter against the fluids within an oil containing reservoir. Such compounds can be utilized in combination of components such as those previously proposed for oil-displacing chemical slugs. Preferred surface active and electrolytic components are described in patents such as the J. Reisberg U.S. Pat. Nos. 3,330,344 and 3,348,611. Suitable semi-polar organic materials are disclosed in the S. C. Jones U.S. Pat. Nos. 3,506,070 and 3,506,071.

The components of a thickened slug and drive fluid that may be injected behind the chemical slug can also comprise thickening agents and aqueous solutions containing combinations of compounds such as those previously proposed for similar uses. Suitable thickeners and drive fluids are described in the patents mentioned above.

Particularly suitable surfactants comprise mixtures of alkali metal salts of petroleum sulfonates (such as alkylaryl sulfonates, alkylated benzene sulfonates, and the like) and sulfated polyoxyalkylated alcohol surfactants. Such petroleum sulfonate surfactants are commercially available for example, as Petroleum Sulfonates, from Bray Chemical Company, BRYTON Sulfonates, from Bryton Chemical Company, PETRONATES and PYRONATES from Sonneborn Division of Witco Chemical Company, PROMOR Sulfonates, from Mobil Oil Company, and the like. Surfactant sulfates of ethoxylated primary alcohols are sold as NEODOLS by Shell Chemical Company. Other surfactant sulfates of ethoxylated alcohols are available as TERGITOLS from Union Carbide, and the like. Particularly suitable mixtures of sulfonate and sulfate surfactants are described in the J. Reisberg, G. Smith, and J. B. Lawson U.S. Pat. No. 3,508,612.

Suitable water soluble thickeners for use in the chemical slug and the thickened slug comprise water-soluble polymeric materials, such as carboxymethyl cellulose, polyethylene oxide, the high molecular weight salts of polymers containing amide and carboxylate groups that are produced by polymerizing acrylamide (or its homologs, such as methylacrylamide) and partially hydrolyzing the amide groups and the like. Particularly suitable thickeners comprise high molecular weight polyelectrolyte polymers such as the partially hydrolyzed polyacrylamides. Such preferred thickeners are available under tradenames such as PUSHER and SEPARAN from Dow Chemical Company. An additional suitable class of polymers are the biopolymers such as Kelzan available from the Kelco Company

EXAMPLE NO. 1

Tests were made of an available petroleum sulfonate having an average molecular weight of 460/470 in designing an aqueous chemical flooding process for a sandstone reservoir at 95°F. The tested sulfonate was oil soluble and only very slightly soluble in water. Following the teaching in J. Reisberg, G. Smith and J. B. Lawson U.S. Pat. No. 3,508,612, NEODOL 25-3S was used to disperse the sulfonate in water and provide the needed multivalent ion tolerance for field application. An apparently satisfactory system was developed using a blend of two waters available in the field. This combination field brine contained 7700 PPM total dissolved solids. About 800 PPM of this total was calcium, barium and magnesium ions present in the brine as the soluble chlorides with substantially the balance of the dissolved solids being sodium chloride. This system was tested in Berea core 776. The core had been saturated with water produced from the field, flooded with field crude oil and waterflooded with produced water to residual oil saturation. The produced water used in these operations, one of two available in the field contained about 77,000 PPM total dissolved solids (8,000 PPM $Ca''$, $Ba''$ and $Mg''$). Oil production started after injection of about one-fourth pore volume of chemical slug and was maintained at a substantially constant rate until about 0.9 pore volume of cumulative injection. After this time, the oil rate began to decline. Emulsions were observed in the produced fluids at about 1.2 pore volumes of injection. Shortly after emulsion production was observed, the oil rate declined to a substantially constant but very low level (oil cuts about 1 percent). All of this oil was in emulsified form and production at the constant low rate was continuing when the test was terminated after more than 2.1 pore volumes of total injection. At termination, slightly over 75 percent of the residual oil had been recovered with about 62 percent of the residual oil recovered before emulsion were observed. Analysis of effluent samples for sulfonate and chloride ion showed that the injected slug was being bypassed by following fluids with only small concentrations of sulfonate being "pulled" along with these fluids. Chloride ion data indicated that the high salinity water originally in the core was not produced as a continuous bank. These observations indicate that emulsions of oil, core water and chemical slug were being bypassed by chemical flood drive solutions.

Chemical systems were designed with the oil soluble sulfonate and PYRONATE 50 mixed with NEODOL 25-3S. Emulsions of reservoir crude oil and produced water with these new chemical systems were compared with emulsions of the same fluids with the oil soluble sulfonate/NEODOL 25-3S system. These comparisons indicated that emulsions were still formed but that their properties had been modified toward both reduced viscosity and more rapid coalesence. The new system was tested in Berea ore 775. Experimental conditions for this test were similar to those used for the test of the original system in core 776 with the following minor exception: as the water soluble sulfonates served also to reduce the amount of NEODOL 25-3S required to disperse the oil soluble sulfonate, systems were adjusted to take advantage of this opportunity to decrease the amount of this relatively expensive component of the chemical slug.

Both core 775 and 776 were 2 inch diameter by 20 inches in length. Each was saturated with the 77,000 PPM TDS produced water, flooded with oil and waterflooded to residual oil saturation with produced water. The chemical flood following waterflood was conducted with the cores in the vertical position to minimize gravity effects and comprised the sequential injection of two slightly different chemical slugs, a thickened water slug and a final water drive. The two chemical slugs differed mainly in that the second slug had more mobility control agent and was thus less mobile than the first chemical slug. This practice has the effect in cores of the present length of allowing emulsions to be generated with the higher mobility slug then driving these emulsions with a relatively lower mobility portion of chemical slug. Thus the emulsions should be moved through the core with little bypassing unless their mobility is extremely low. In this case, the second slug will finger through the initial emulsions and generate additional emulsions itself.

Figure 2:
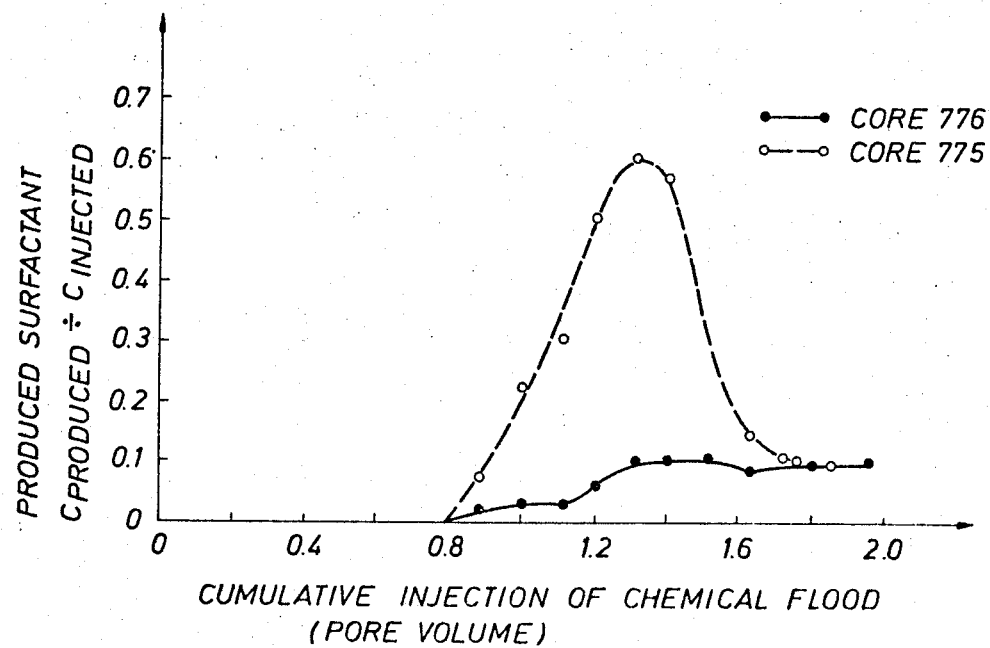
Figure 3:
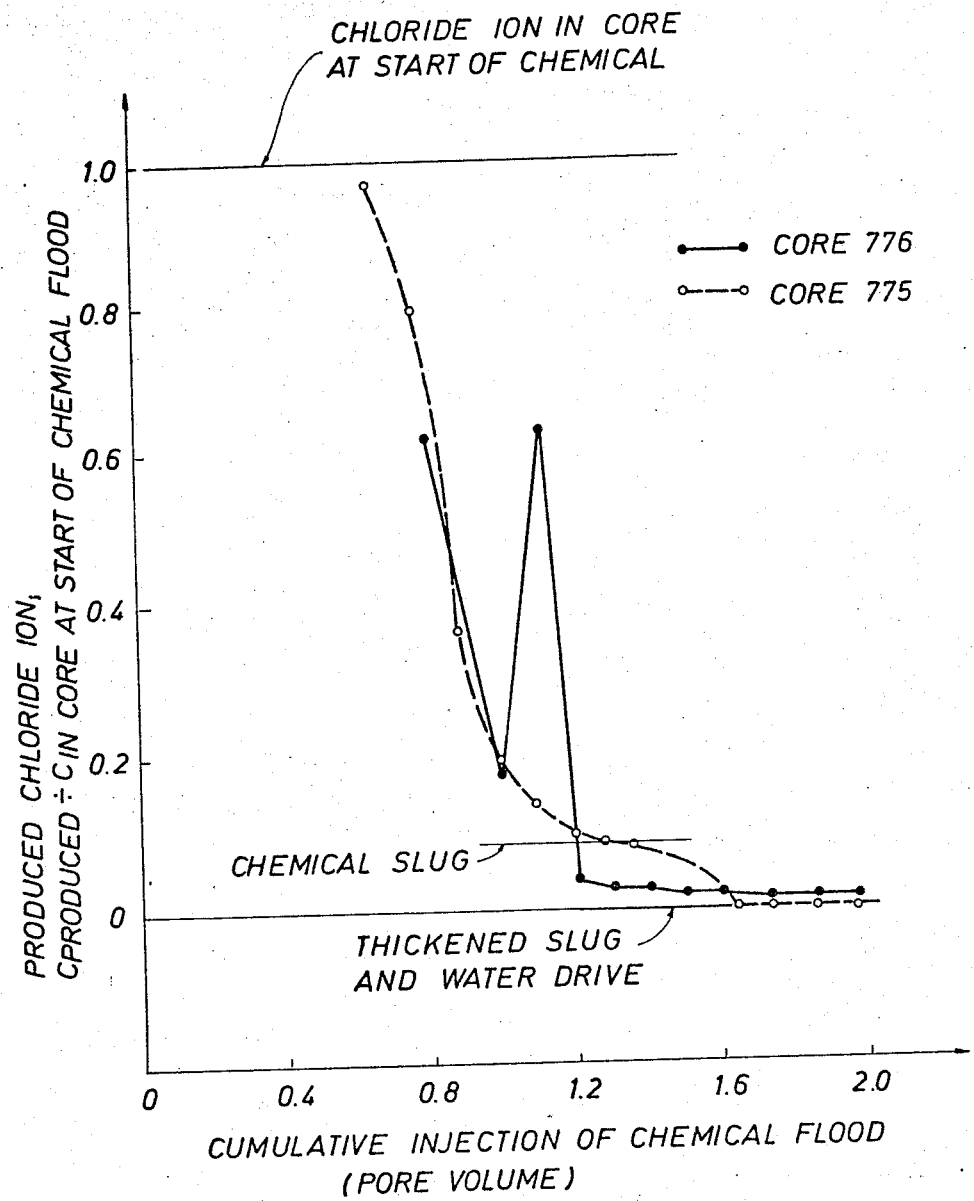

Table No. 1 summarizes pertinent core data, chemical slug composition and actual flooding sequence and volumes. FIGS. 1, 2 and 3 summarize the production data. Oil production data (FIG. 1) shows the sharp reduction in bypassed oil which occurred with the modified slug. Using the original slug in core 776, 2.0 pore volumes of total injection were required to produce about 78 percent of the residual oil. This same percent of residual oil was produced from core 775 with the modified chemical slug after only 1.2 pore volumes of injection. As 0.8 pore volumes injection into many oil reservoirs would require several years, the advantage of the accelerated production obtained in 775 is of real economic significance. Of further economic significance is the fact that oil cuts from core 775, remained high until 95 percent of the residual oil had been recovered at about 1.56 pore volumes of total injection. Oil cuts from 775 had dropped much earlier. An unobvious result is the fact that emulsion production was obtained when about the same percentage of the original oil had been produced from the two cores (67 percent for 775 and 64 percent for 776) but the emulsion mobility in 775 had been substantially increased by the inclusion of PYRONATE 50 in the chemical slug formulation. As a result of this increase in emulsion mobility, it was possible for the latter part of the chemical slug and its following thickened slug to move the oil emulsion out of the core. This interpretation is supported by the data for sulfonate and chloride ion concentrations in produced fluids which are given in FIGS. 2 and 3. FIG. 2 shows clearly that the chemical slug was highly dispersed and lost in core 776 but retained its integrity and was substantially produced from core 775. Chloride ion data for core 776 do not show the characteristic plateau at the salinity of the injected chemical slug—again showing that the chemical slug was dispersed and, to a large degree, bypassed by the following fluids in this core.

EXAMPLE NO. 2

In Example No. 1, it was found that inclusion of PYRONATE 50 in the chemical slug formulation resulted in increasing emulsion mobility so the emulsion could be displaced from the core but did not substantially increase the amount of residual oil recovered in the form of clean water-free oil. It is desirable to eliminate or avoid emulsions both because of the added cost and inconvenience of treating produced emulsions to recover saleable oil and because the possibility exists that stable emulsions persisting for long times in the reservoir environment might undergo inversion or other changes which would convert them back to viscous emulsions. Tests were made of means for effectively reducing emulsion formation. Screening tests indicated that isobutyl alcohol (IBA) was uniquely effective in increasing the coalesence rate of emulsions of typical chemical slugs, formation waters and crude oil which were formed in laboratory glassware by mechanical agitation. Table 2 gives a typical comparison of coalesence rates for emulsions obtained from chemical slugs with and without IBA (Iso-butyl alcohol). In order that these tests be made on systems having comparable interfacial activity, total dissolved solids in the IBA system were reduced. Chemical slug A (Table 2) was identical in

TABLE 1

| Core Number | | 776 | 775 |
|---|---|---|---|
| Core Data | | | |
| Porosity | percent | 21.1 | 20.7 |
| Permeability | millidarcies | 665 | 580 |
| Residual Oil Saturation | percent | 41 | 38 |
| Chloride Ion in Water | meg/Gm. | 1.26 | 1.26 |
| Chemical Slug Composition | | A | B | A | B |
| Petroleum Sulfonate 460/470 | meg/Gm. | 0.034 | 0.034 | 0.017 | 0.017 |
| Neodol 25-3/S | percent | 1.0 | 0.6 | 0.6 | 0.2 |
| Pyronate 50 | meg/Gm. | | | 0.017 | 0.017 |
| Pyronate 50 | meg/Gm. | | | | |
| Pusher 700 | PPM | 200 | 400 | 200 | 400 |
| Chloride Ion | meg/Gm. | 0.11 | 0.09 | 0.12 | 0.11 |
| Thickened Slug Composition | | | | | |
| Pusher 700 | PPM | | 300 | | 300 |
| Chloride Ion | meq/Gm. | | 0.001 | | 0.001 |
| Final Water Drive | | | | | |
| Chloride Ion | meq/Gm. | | 0.001 | | 0.001 |
| Chemical Flood Volumes | | | | | |
| Chemical Slug A | pore Vol. | | 0.29 | | 0.23 |
| Chemical Slug B | pore Vol. | | 0.22 | | 0.25 |
| Thickened Slug | pore Vol. | | 0.75 | | 0.78 |
| Water Drive | pore Vol. | | 0.73 | | 0.82 | composition with slug A in Example 1. Chemical slug C (Table 2) was identical to A except that total dissolved solids were reduced from 7,700 PPM to 6,200 PPM for the reason stated above and 8 percent by weight of IBA was substituted for an equivalent amount of water.

TABLE 2

| Crude Oil Vol. % | Chemical Slug | Fraction of Oil Free After (hrs) | | | | |
|---|---|---|---|---|---|---|
| | | 0.083 | 0.5 | 1 | 3 | 24 |
| 23 | A | 0 | 0 | 0 | 0.02 | 0.04 |
| | C | 1.0 | 1.0 | 1.0 | 1.0 | 1.0 |
| 35 | A | 0 | 0 | 0 | 0.01 | 0.05 |
| | C | 1.37* | 1.0 | 1.0 | 1.0 | 1.0 |
| 50 | A | 0 | 0 | 0 | 0 | 0.02 |
| | C | 1.4 | 1.0 | 1.0 | 1.0 | 1.0 |

* A number in excess of 1 indicates that oil contained water or aqueous phase.

To determine if the highly effective coalesence observed in laboratory glassware could be realized in practice, these two chemical systems were tested in 2 inch diameter by 10 inch long Berea cores (794 and 800) which were at waterflood residual oil saturation. Conditions during these two experiments were such that emulsification would be encouraged. These conditions are: (1) the chemical slugs were viscously unstable, (2) cores were horizontal allowing gravity effects to augment the instability effects and encourage mixing and bypassing and (3) the flood rates were equivalent to a frontal advance rate of about 5 feet per day thus increasing shear effects above the levels which would normally be encountered in oil reservoirs at points removed from injection or producing wells. For the core tests, both chemical slugs were prepared in identical field brine containing about 7,700 PPM total dissolved solids. Forty nine percent of the oil produced from core 794 by injecting chemical slug A (without IBA) was in the form of a stable emulsion. This result contrasts sharply with the complete absence of stable emulsions in the production from core no 800 (slug containing IBA). Total oil production from each core was substantially equal.

EXAMPLE NO. 3

A chemical flooding slug was prepared with a composition as follows: (1) 0.036 meq/gm. of a 460/470 molecular weight sodium petroleum sulfonate (2) 1 percent by weight of NEODOL 25-3S, (3) 1350 PPM of the biopolymer KELZAN M (sold by Kelco Co.), and (4) a blend of two field waters to give a solution containing about 3,800 PPM of total dissolved electrolyte. Emulsions of this chemical slug and a field crude oil were prepared in laboratory glassware and examined. The emulsions separated into an oil phase, an emulsion phase and an aqueous phase within about 2 hours but the emulsion phase persisted throughout the 12-hour observation period. Another chemical slug, differing only in that this second slug contained 4 percent by weight of iso-butyl alcohol substituted for an equivalent amount of water was prepared. Emulsions of field crude with this second chemical slug broke in less that 2 hours into a clean oil phase and a clear phase containing most of the surfactant IBA, and a small fraction of solubilized oil.

Figure 4:
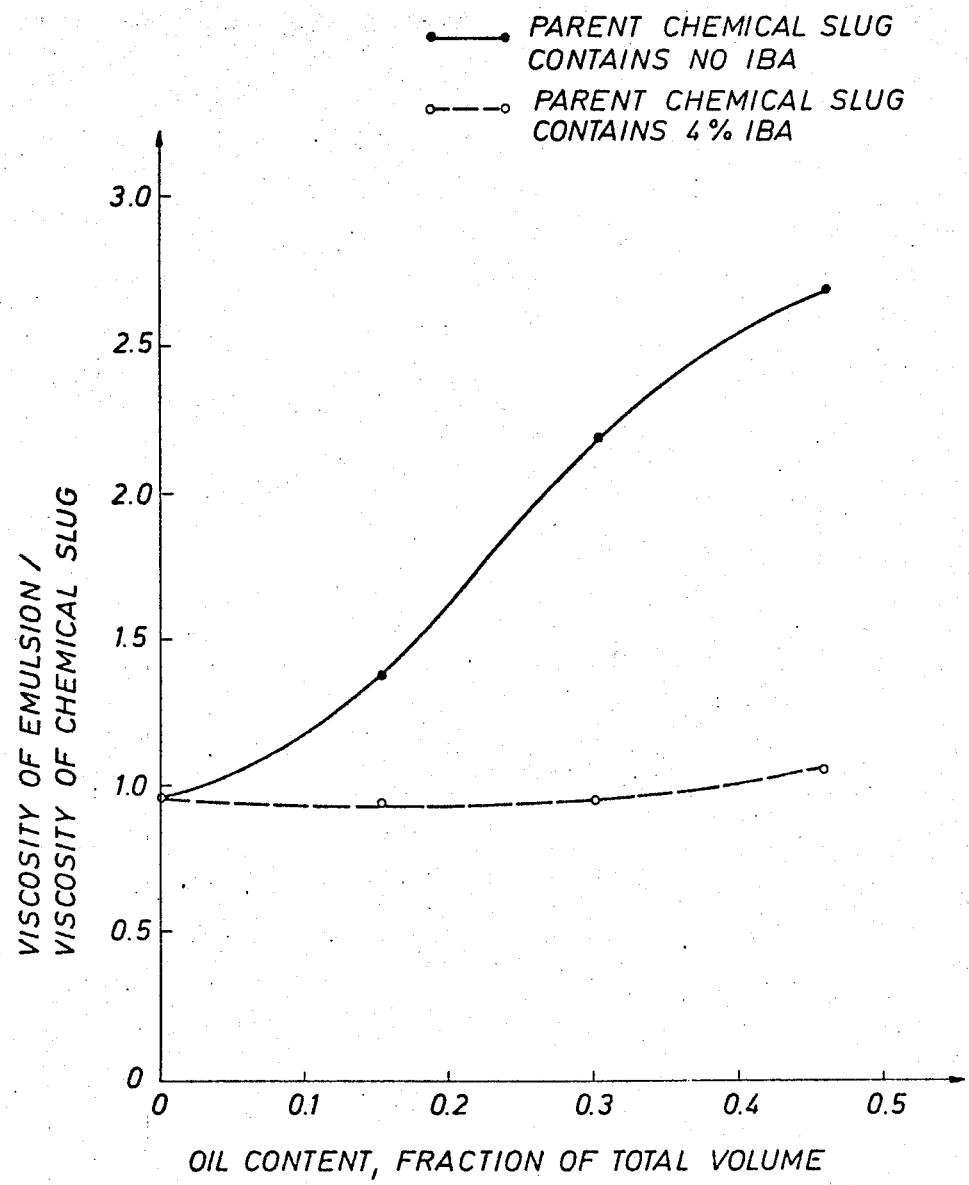

The emulsion samples from both chemical slugs were mechanically mixed, transferred to a Brookfield Viscometer and their viscosities determined at 95°F. and at a shear rate of 7.3 Sec-1. FIG. 4 gives these data as the ratio of emulsion viscosity to the parent chemical slug viscosity as a function of oil fraction in the emulsion. It is apparent that the use of 4 percent IRA modifies the emulsion stability and viscosity. Both modifications are favorable for improved oil recovery from use of the IBA-containing slug in a chemical flooding process.

EXAMPLE NO. 4

A chemical slug was prepared for application in a chemical flood process in a sandstone reservoir at 195°F. The formulation of this slug was as follows: (1) 0.02 meq/gm. or 1.65 percent of a sodium petroleum sulfonate having an average molecular weight of 540, (2) 1 percent by weight of a highly polyethoxylated long chain alcohol, NEODOL 25-30, available from Shell Chemical Company, (3) a blend of two available field waters blended to obtain a water containing about 13,000 PPM of total dissolved solids and comprised substantially of sodium chloride but containing a total calcium, barium, and magnesium ion content of approximately 560 PPM.

Emulsions of this system with the crude oil from the reservoir were examined at 195°F. and found to be 6 to 8 times as viscous as the parent chemical slug.

A second chemical slug, identical with the first except that 0.4 percent by weight of ETHODUOMEEN T/25, an ethoxylated diamine available from Armour Chemical Company was added as an emulsion modifier. Emulsions of field crude with this second chemical slug were found to be only 0.8 to 1.4 times the viscosity of the parent chemical slug.

Figure 5:
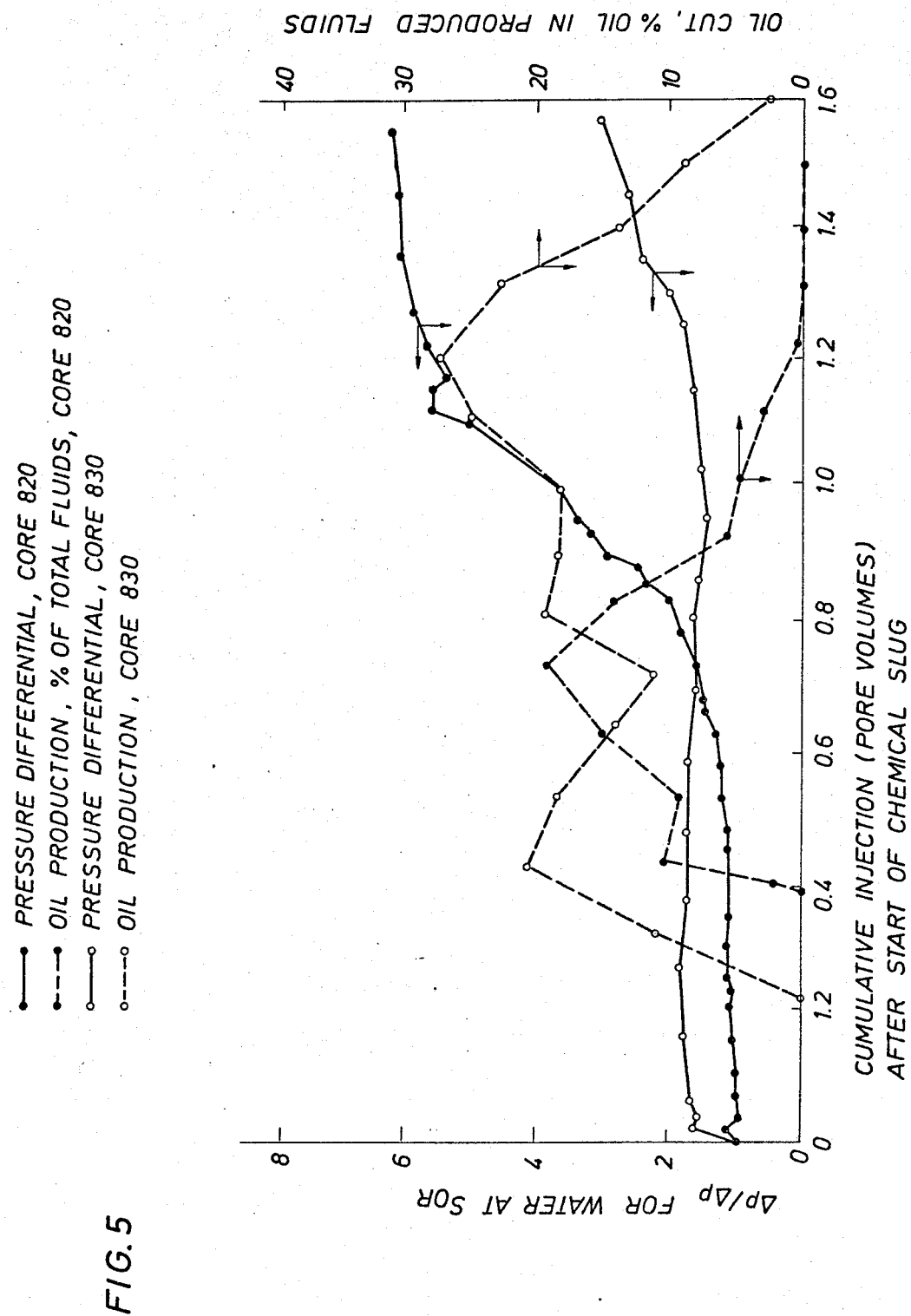

Two Berea cores (2 inch diameter by 20 inches length) having approximately 21.5 percent porosity and 650 millidarcies permeability were selected, saturated with the same brine used to prepare the chemical slugs, and brought to a temperature of 195°F. in an air bath. The cores were flooded with field crude oil, and waterflooded to residual oil saturation with the aforementioned brine. Residual oil saturation was 38 percent in core 820 and 39 percent in core 830. Core 820 was used to test the performance of the aforementioned slug which did not contain ETHODUOMEEN T/25 and core 830 was used to test the slug containing ETHODUOMEEN T/25. In each case, a fractional pore volume slug of the chemical system was injected into the bottom of the vertically positioned core. Chemical slugs were followed by a thickened water solution of 1,500 PPM KELZAN M in the blended brine used to prepare the chemical slugs. Pressure differential across the core was recorded continuously during the experiment and produced fluids were observed for evidence of produced emulsion and were analyzed for total oil content including any oil produced in emulsions. Pressure differential and oil cut are given in FIG. 5. Produced samples from core 820 did not show any evidence of emulsion or of surfactant during the production period covered by the figure. Injection continued in this core for an additional 1.1 pore volumes during which time oil cuts again rose to as high as 15 percent with most of the later oil being in the form of an emulsion with surfactant. Fifty six percent of the original residual oil was finally recovered from the core. It is apparent from the pressure data given in FIG. 4 and the observations recorded above that the chemical slug formed emulsions in core 820 immediately upon entering the core. This emulsion was much more viscous than the slug so the slug fingered through or bypassed the emulsion and displaced some oil to the outflow end of the core. Ultimately all of the slug (0.48 pore volumes) was dispersed in the core as bypassed emulsion.

The thickened slug used in both cores had a viscosity at the reservoir temperature of 195°F. which was 6 times the viscosity of the chemical slug for 820. Since this high viscosity drive did not effect a piston like displacement of the emulsion, it must be concluded that the emulsion had an even higher viscosity.

Contrasting sharply with the performance of the chemical flood in core 820, the chemical slug containing the emulsion modifier (ETHODUOMEEN T/25) gave significantly improved performance in core 830. Oil production started significantly earlier, reached higher produced cuts and was sustained for a longer period of time. Total oil produced from 830 during 1.67 pore volumes of injection was 62.5 percent of the original residual oil in the core. This contracts with only 23 percent of residual produced from 820 after the same period of injection. Ultimate production was 56 percent of residual for the slug without emulsion modifier but 2.65 pore volumes of injection were required. The distinct advantage of the emulsion modifier is apparent.

EXAMPLE NO. 5

A chemical slug using sodium petroleum sulfonate of average molecular weight 460/470 was developed for application in a 95°F. sandstone reservoir containing water with about 3,900 PPM total dissolved solids. Emulsions of the crude oil in chemical slugs prepared from the specified sulfonate and NEODOL 25-3S were viscous and stable. PYRONATE 30, a water soluble sodium sulfonate (Witco Chemical Co.) was incorporated in the slugs with distinct reduction in the emulsion viscosities and some improvement in emulsion coalesence rates. Examination of the effect of including tertiary butyl alcohol, iso propyl alcohol and ethyl alcohol in the slug formulation showed that in general emulsion viscosities were reduced but coalesence rates were not substantially affected. Iso butyl alcohol resulted in both reduced viscosity and more rapid coalesence. Considering both economics and technical performance, the optimum slug for this particular reservoir and its associated crude oil and water was determined to be of the following composition:

| Component | | Active Ingredient Percent | Wt% | Meq/Gm. |
|---|---|---|---|---|
| Sodium Petroleum Sulfonate | 460/470 | 62.5 | 2.1 | 0.03 |
| Pyronate 30 | 330/350 | 30 | 3.1 | 0.02 |
| Neodol 25-3S | 440 | 59 | 0.8 | 0.01 |
| Iso butyl alcohol | | 100 | 0.6 | |

In addition, the slug had 800 PPM of PUSHER 700 for mobility control and 160 PPM of DOWICIDE G to prevent biological attack on any of the slug components. The slug was designed to be both viscously stable and chromatographically balanced.

A slug having the above formulation and comprising a volume equal to 0.276 pore volumes of the 2 inch diameter by 30 inch length Berea core number 897 was injected into the horizontal core which had previously been saturated, flooded with crude oil and waterflooded to a residual oil saturation of 36 percent. The chemical slug was followed by a thickened slug containing 500 PPM PUSHER 700 in an available fresh lake water. Oil production started after 0.13 pore volumes of injection. Traces of chemical slug was produced at 0.85 pore volumes of total injection at which time 78 percent of the residual oil had been produced. Production of chemical slug, oil and emulsions of these components were produced until 96 percent of the residual oil had been produced at 1.36 pore volumes of cumulative injection. No further oil was produced (final residual oil saturation of one percent), but some additional chemical was produced. The oil/emulsion/chemical slug production fluids between 0.78 Vp and 1.36 Vp injection were heated to 195°F, examined and found to be clean oil and an aqueous phase only. After cooling to room temperature, the oil and aqueous phases were separated.

What is claimed is:

1. In a process for displacing an oil within a subterranean reservoir, the improvement comprising:

testing oil displacement properties of an active aqueous surfactant system relative to said reservoir at the reservoir temperature;

where said tests indicate an oil displacement efficiency reduction due to a production of a low mobility emulsion, adding an emulsion modifier to said surfactant system formulation and applying said tests to the so-modified surfactant system; and displacing said oil within said subterranean reservoir by injecting into the reservoir an active aqueous surfactant system containing an emulsion modifier that avoids the deleterious effects of an emulsion formed in said reservoir by a dilute active aqueous surfactant system.

2. The process of claim 1 in which said emulsion modifier is a preferentially water soluble semipolar organic compound.

3. The process of claim 2 in which said emulsion modifier is isobutyl alcohol.

4. The process of claim 3 in which said surfactant system contains a mixture of petroleum sulfonates or the alkali metal or ammonium salts of petroleum sulfonates and sulfated polyalkoxylated alcohol surfactants or poly-alkoxylated alcohol surfactants.

5. The process of claim 4 in which said surfactant system contains a water soluble polyelectrolyte thickener.

6. The process of claim 5 in which said thickener is a partially hydrolyzed polyacrylamide.

7. The process of claim 5 in which said thickener is a biopolymer.

8. The process of claim 1 in which said emulsion modifier is a preferentially water soluble anionic surfactant.

9. The process of claim 1 in which said emulsion modifier is a mixture of preferentially water soluble sulfonates or the alkali metal or ammonium salts of preferentially water soluble sulfonates.

10. The process of claim 9 in which said surfactant system contains a mixture of petroleum sulfonates or the alkali metal or ammonium salts of petroleum sulfonates and sulfated polyalkoxylated alcohol surfactants or polyalkoxylated alcohol surfactants.

11. The process of claim 10 in which said surfactant system contains a water soluble polyelectrolyte thickener.

12. The process of claim 11 in which said thickener is a partially hydrolyzed polyacrylamide.

13. The process of claim 11 in which said thickener is a biopolymer.

14. The process of claim 1 in which said emulsion modifier is a cationic surfactant.

15. The process of claim 14 in which said emulsion modifier is a polyethoxylated diamine.

16. The process of claim 15 in which said surfactant system contains a mixture of petroleum sulfonates or the alkali metal or ammonium salts of petroleum sulfonates and sulfated polyalkoxylated alcohol surfactants or polyalkoxylated alcohol surfactants.

17. The process of claim 16 in which said surfactant system contains a water soluble polyelectrolyte thickener.

18. The process of claim 17 in which said thickener is a partially hydrolyzed polyacrylamide.

19. The process of claim 17 in which said thickener is a biopolymer.

20. The process of claim 1 in which the emulsion modifier is a synergistic mixture of preferentially water soluble semi-polar compounds and surfactants.

21. The process of claim 20 in which said emulsion modifier is a synergistic mixture of isobutyl alcohol and water soluble sulfonates or alkali metal or ammonium salts of water soluble sulfonates.

22. The process of claim 21 in which said surfactant system contains a mixture of petroleum sulfonates or the alkali metal or ammonium salts of petroleum sulfonates and sulfated polyalkoxylated alcohol surfactants or polyalkoxylated alcohol surfactants.

23. The process of claim 22 in which said surfactant system contains a water soluble polyelectrolyte thickener.

24. The process of claim 23 in which said thickener is a partially hydrolyzed polyacrylamide.

25. The process of claim 23 in which said thickener is a biopolymer.

* * * * *